United States Patent [19]

Spiegelman et al.

[11] Patent Number: 4,659,898
[45] Date of Patent: Apr. 21, 1987

[54] METHOD OF ATTACHING A THERMOCOUPLE TO A METAL SURFACE

[75] Inventors: Stanley R. Spiegelman, Churchhill Boro; Philip E. Miller, Greensburg; Nathaniel Washington, Monroeville; Vincent J. Grande, Verona, all of Pa.

[73] Assignee: Westinghouse Electric Corp., Pittsburgh, Pa.

[21] Appl. No.: 699,361

[22] Filed: Feb. 7, 1985

[51] Int. Cl.$^4$ ............................................. B23K 11/32
[52] U.S. Cl. ................................. 219/117.1; 219/72
[58] Field of Search ............... 219/72, 74, 86.1, 117.1, 219/118, 108; 136/202, 229; 228/101

[56] References Cited

U.S. PATENT DOCUMENTS

| | | | |
|---|---|---|---|
| 2,379,317 | 6/1945 | Picciano | 136/229 X |
| 2,517,053 | 8/1950 | Thompson | 136/4 |
| 3,132,236 | 5/1964 | Deininger | 219/91 |
| 3,143,439 | 8/1964 | Hansen | 136/4 |
| 3,556,864 | 1/1971 | Wagner | 136/228 |
| 3,716,450 | 9/1973 | Lions | 376/247 |
| 3,874,239 | 4/1975 | Finney | 374/147 |
| 3,939,554 | 2/1976 | Finney | 29/573 |
| 4,023,411 | 5/1977 | Escher | 136/233 |
| 4,043,200 | 8/1977 | Finney | 228/101 |
| 4,164,433 | 8/1979 | Granahan et al. | 136/229 |
| 4,324,945 | 4/1982 | Sivyer | 136/242 |
| 4,338,479 | 7/1982 | Bauman | 136/229 |
| 4,415,758 | 11/1983 | Lacoste et al. | 136/233 |
| 4,438,290 | 3/1984 | Wells, Jr. et al. | 136/221 |
| 4,477,687 | 10/1984 | Finney | 136/229 |

FOREIGN PATENT DOCUMENTS 1462189  1/1977  United Kingdom ................ 219/72

Primary Examiner—E. A. Goldberg
Assistant Examiner—C. M. Sigda
Attorney, Agent, or Firm—Daniel C. Abeles

[57] ABSTRACT

A method of mounting a thermocouple assembly on a surface of a metal member by fusion welding of the thermocouple assembly sheath to the metal surface whereby the welding operation can be entirely carried out from a remote location either in air or in an underwater environment. The method generally comprises: positioning the thermocouple assembly so that the axis of the sheath extends perpendicular to the surface of the metal member, pressing the thermocouple assembly against the surface of the metal member so that the outer end surface of the tip portion of the sheath contacts the surface of the metal member; and fusion welding the tip portion to the surface of the metal member by connecting a source of d.c. potential across the sheath and the metal member and passing a d.c. current through the metal sheath and the metal member for a desired period of time.

14 Claims, 2 Drawing Figures

METHOD OF ATTACHING A THERMOCOUPLE TO A METAL SURFACE

BACKGROUND OF THE INVENTION

The present invention relates to a method of attaching a thermocouple to a metal surface. More particularly, the present invention relates to a method of attaching a thermocouple enclosed in a metal sheath to a surface of a metal member which is particularly applicable for the attachment of a thermocouple to the inner surface of a nuclear reactor vessel which is underwater and from a remote location.

As a result of constant bombardment by gamma radiation during use, the metal of a nuclear reactor vessel, and in particular the copper in the welds, tends to lose its ductility over a period of time and to become brittle. This presents a problem of possible cracks resulting in the nuclear reactor vessel, particularly when cold water is suddenly introduced into the cooling system as a result of a malfunction which results in a sudden shut down of the system. It is therefore desireable to periodically subject the reactor vessel to an annealing process, wherein the reactor vessel is heated to a specific temperature over a specificied period of time, in order to return the desired ductility to the metal of the nuclear reactor vessel. To perform this annealing process, the vessel is opened, the contects are removed, and an annealing heater is installed in the interior of the vessel. Because of the existence of an extremely high radiation level in a reactor vessel which requires annealing, the vessel is normally submerged in water so as to significantly reduce the exposure to radiation by personnel during the operations involved in the installation of the annealing heater unit.

To monitor the temperature of the surface of the reactor vessel during the annealing process, it is necessary to distribute a plurality of thermocouples over the inner surface of the reactor vessel. As it is known, the most accurate method of measuring the temperature of a body is to either weld thermocouples to the surface of the body or to place them in thermowells, i.e. drilled holes in the surface. However, because of the extremely high radiation levels which exist in a reactor vessel which requires annealing, direct access to enable the hands-on welding of thermocouples to the inner surface of the reactor vessel is not practical and any welding process must be able to be initiated or actuated from a remote location. Moreover, the drilling of thermowells in the wall of a reactor vessel is not acceptable. Finally, the fact that the reactor vessel, and particularly the inner surface of the vessel to which the thermocouples are to be attached, is underwater presents still a further problem to be solved.

SUMMARY OF THE INVENTION

It is therefore an object of the present invention to provide a method of attaching a thermocouple to a metal surface which can be carried out from a remote location and which can be carried out even though the attachment is to take place underwater.

The above object is basically achieved according to the present invention by a method of attaching a thermocouple assembly to a surface of a metal member by fusing or welding the thermocouple tip, and more specifically the tip of the thermocouple metal sheath, to the surface of the metal member utilizing direct current. More specifically, the above object is achieved by a method wherein a thermocouple assembly, including an elongated tubular metal sheath having a metal tip portion closing one end, and a pair of spaced thermocouple wires axially extending along the sheath and being insulated from each other and from the metal sheath with the conductors being connected to each other adjacent the tip bearing end of the sheath to form a measuring junction which is axially spaced from the metal tip portion, is positioned so that the axis of the sheath extends perpendicular to the surface of the metal member; the thermocouple assembly is pressed against the surface of the metal member so that the outer end surface of the tip portion contacts the metal member surface; and the tip portion is fusion welded to the metal member surface by connecting a source of d.c. potential across the sheath and the metal member and passing a d.c. current through the metal member and the metal sheath for a desired period of time. The process according to the invention may be carried out either in air or underwater and consequently can be utilized to attach the thermocouple to the inner surface of a submerged nuclear reactor vessel.

According to a further feature of the invention, which is particularly applicable for attaching the thermocouples to the inner surface of a submerged nuclear reactor vessel, the opposite end of the thermocouple assembly extends out of the water and the source of d.c. potential is connected to this opposite end of the thermocouple sheath, whereby the welding or fusion may be actuated or initiated from a remote location.

According to a further feature of the invention, the outer surface of the tip portion of the thermocouple sheath, i.e., the portion which contacts and is welded to the surface of the metal member, is flat and perpendicular to the longitudinal axis of the sheath and preferably has a reduced diameter so as to concentrate the current flowing in the weld area.

Finally, according to still a further feature of the invention when welding underwater, the portion of the thermocouple sheath immersed in the water during the welding process, including the weld area itself, is surrounded by a inert gas atmosphere, for example by flowing a inert gas under pressure through a tube surrounding the thermocouple sheath. This feature is particularly desireable if the purity of the welds is of concern or becomes a problem, i.e. if there is a danger of the welds being contaminated by contaminants in the surrounding water.

DETAILED DESCRIPTION OF THE PREFERRED EMBODIMENTS

Figure 1:
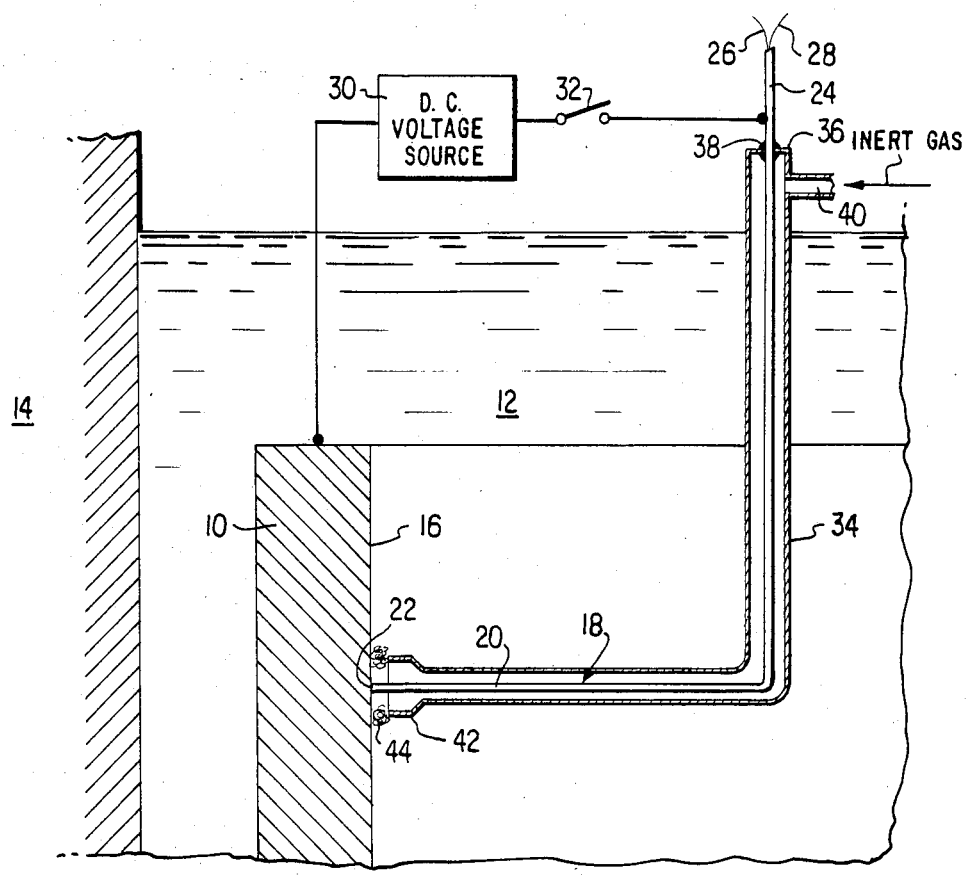
FIG. 1 is a schematic elevational view used to illustrate and explain the method according to the invention for attaching a thermocouple to the inner surface of a submerged nuclear reactor vessel.

Referring now to FIG. 1, there is schematically shown a portion 10 of a sidewall of a nuclear reactor vessel which is submerged under water 12 in a surrounding containment structure 14. As pointed out above, during an annealing process for the reactor vessel 10, it is necessary to attach a number of thermocouples to the interior surface 16 of the reactor vessel wall 10. One such thermocouple assembly 18 which is attached to the surface 16 by the tip portion of its metal sheath 20 according to the present invention is shown in FIG. 1.

As shown in FIG. 1, and contrary to conventional thermocouple sheath contacting arrangements wherein the thermocouple sheath tip portion is connected or welded via its peripheral surface to a surface to be monitored, i.e., the longitudinal sheath axis is parallel to the connecting surface, according to the present invention the thermocouple assembly 18 is positioned so that its longitudinal axis adjacent the surface 16 of the wall 10 extends essentially perpendicular to the surface 16 and contacts, and is welded to, the surface 16 only at the tip or end surface 22 of the metal sheath 20 for the thermocouple assembly 18. The opposite end 24 of the thermocouple assembly 18 extends above the surface of the water 12 to a location (not shown in detail) remote from the vessel where the conductors 26 and 28 of the thermocouple may be connected to conventional measuring instrumentation (not shown). Also disposed at the remote location is a source of d.c. voltage 30 which is connected via a switch 32 between the outer metal sheath 20 of the thermocouple assembly 18 and the sidewall 10 of the reactor vessel.

In order to fasten or weld the thermocouple assembly 18 ot the inner surface 16 of the wall 10, the assembly 18 is initially positioned as illustrated in FIG. 1 with its longitudinal axis, at least the portion thereof containing the tip portion of the thermocouple assembly 18, disposed essentially perpendicular to the surface 16 and with the outer end surface 22 being pressed against the surface 16. Thereafter the switch 32 is closed for a period of time sufficient to cause the d.c. current produced by the d.c. voltage supply 30 and passing through the sheath 20 and the wall 10 to fusion weld the tip portion surface 22 of the thermocouple assembly 18 to the surface 16. The proper positioning of the thermocouple assembly 18 with its end surface 22 contacting the surface 16 may be accomplished in any conventional manner and preferably from a remote location above the level of the water 12. For example, the positioning can be done by a remotely controlled arm which grips the thermocouple assembly 18 in an electrically insulating manner, or by means of a guide tube of the type conventionally used for the placing of thermocouples and other devices in nuclear reactors. In such cases, at least the area where the fusion weld takes place, and possibly the entire outer surface of the submerged portion of the sheath 20, is surrounded by and in direct contact with the water 12. Alternatively, according to a further feature of the invention, if possible contamination of the weld, for example by contaminants in the water 12, is a problem, a specialized type of guide tube arrangement may be utilized whereby the outer surface of the sheath 20, and in particular the area of the fusion weld adjacent the tip 22 may be surrounded by an inert gas atmosphere. Such a specialized guide tube arrangement is likewise schematically shown in FIG. 1.

As shown in FIG. 1, the specialized guide tube arrangement essentially includes a tube 34, for example, of stainless steel, in which the thermocouple assembly 18 is axially mounted, for example, by means of electrically insulating spacers (not shown). The upper end of the tube 34 is sealed by means of a lid 36 having a central opening containing a sealing brushing 38 of electrical insulating material through which the upper end 24 of the thermocouple assembly 18 passes in an air tight manner. The portion of the tube 34 above the level of water 12 is likewise provided with a gas inlet opening 40 which is connected to a source (not shown) of a pressurized inert gas such as argon or carbon dioxide.

To permit the pressurized inert gas entering the tube 34 via the nozzle 40 to flow through the tube 34 so as to ensure an inert gas atmosphere in the weld area, i.e. the area of contact between the end surface 22 and the surface 16, the lower end of the tube 34 is provided with a porous nozzle arrangement which will permit the escape of the pressurized inert gas while isolating the weld area from the surrounding water 12. Although any suitable porous nozzle arrangement which will accomplish this purpose may be utilized, preferably, as shown, the nozzle arrangement includes a flared or enlarged lower end section 42 for the tube 34 which terminates a short distance from the surface 16 when the end surface 22 of the assembly 18 is in contact therewith and an annular ring 44 of a porous material, preferably a yieldable porous material such as stainless steel wool as schematically shown, which is attached to the free end of the nozzle section 42 and fills the space between same and the surface 16 when the end surface 22 of the thermocouple assembly 18 is in contact with the surface 16. The use of such an annular ring 44 of yieldable porous material has the advantage of compensating for any irregularities in the surface 16 so as to provide for a better seal, while still permitting the pressurized gas to escape so as to maintain dry conditions at the fusion or welding region during the welding process. In operation of this specialized guide tube arrangement, the flow of inert gas under pressure is preferably maintained during the positioning operation of the thermocouple assembly so as to substantially prevent any water from entering the lower end of the guide tube prior to establishing the contact between the annular ring 44 and the surface 16.

Although, depending on the particular application and the selected welding parameters, it should theoretically be possible to utilize the method according to the invention with any thermocouple assembly having a metal sheath with a solid metal sheath tip portion adjacent the measuring junction and a measuring junction which is spaced and electrically insulated from the conductive sheath tip portion, it has been found that a modification of the conventional sheath tip portion geometry is required, or is at least desirable, in order to provide suitable welds utilizing the method according to the invention under practical operating conditions and so as to optimize the subsequent thermocouple response. To monitor the surface of a reactor vessel during an annealing process as discussed above, it has been found that satisfactory welds using the method according to the invention can be obtained by utilizing a type "K" (Chromel-Alumel) thermocouple assembly with a stainless steel sheath.

Figure 2:
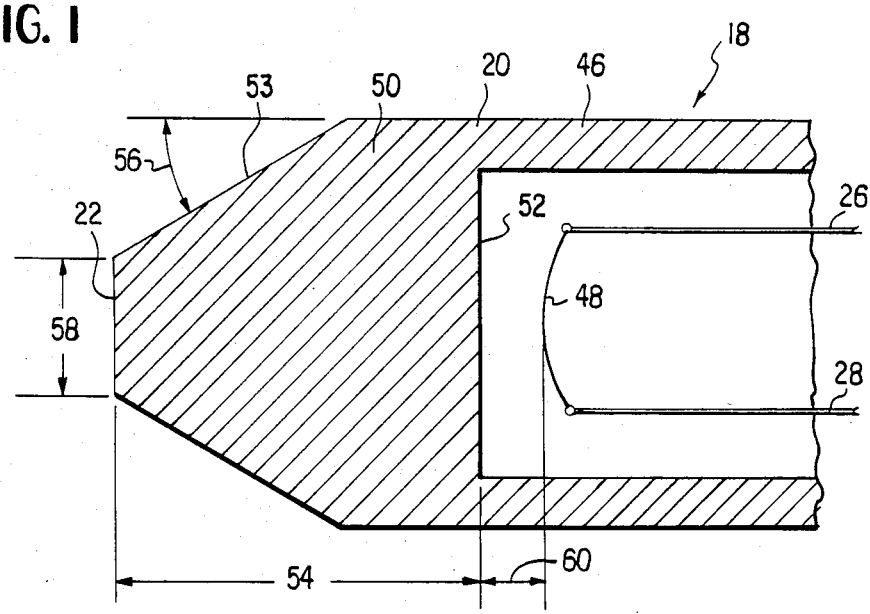
FIG. 2 is an enlarged partially schematic cross sectional view showing the preferred arrangement of the tip of the thermocouple assembly prioir to fusion to the surface of the reactor vessel.

As shown in FIG. 2, the thermocouple assembly 18, in a conventional manner, includes a metal sheath 20 having a hollow cylindrical portion 46 whose end adjacent the measuring junction 48 of the thermocouple is closed by a solid cylindrical tip portion 50. The thermocouple itself includes the thermocouple wires 26 and 28 which are disposed within the hollow cylindrical portion 46 of the sheath 20 and extend longitudinally along same in a spaced relationship. The ends of the wires 26 and 28 adjacent the tip portion 50 are joined to form the measuring junction 48 which, as shown, is spaced from the inner surface 52 of the tip portion 50 in an electrically insulating manner. The wires 26 and 28 and the measuring junction 48 are supported within the cylindrical portion 46 of the sheath 20 in a conventional manner (not shown) so as to maintain their relative spacings.

As shown, the outer end surface 22 of the tip portion 50 is formed as a flat surface which is substantially perpendicular to the longitudinal axis of the thermocouple assembly 18 and thus aids in the proper positioning of the thermocouple assembly against the wall to be monitored for the purpose of forming the fusion weld. Moreover, as shown in FIG. 2, and in order to concentrate the current passing through the weld area, and thus concentrate the heating effect, the conventional cylindrical peripheral surface of the tip portion 50 is provided with a conically tapered portion 53 which tapers in a direction such as to cause the end surface 22 to have a diameter which is less than that of the outer diameter of the thermocouple sheath 20. In a preferred embodiment of a thermocouple assembly using a conventional type "K" (Chromel-Alumel) thermocouple having a sheath formed of 308 stainless steel with a ⅛ inch outside diameter and a nominal wall thickness for the hollow cylindrical portion 46 of 0.016 inch, the tip geometry is modified as shown in FIG. 2 by providing a length 54 between the surface 22 and the surface 52 of the tip portion 50 of 0.130 to 0.170 inch, by providing a taper angle 56 for tapered portion 53 of 25° to 35°, and by providing a diameter 58 for the surface 22 of from 0.040 to 0.060 inch. Additionally, in order to prevent damage to the thermocouple junction 48, and/or optimize the response of the thermocouple following the fusion welding process according to the invention, the longitudinal spacing 60 between the inner surface 52 of the tip portion and the measuring junction 48 should be between 0.010 and 0.020 inch.

In a specific example of the method according to the present invention utilizing a thermocouple according to the preferred embodiment as shown in FIG. 2 and of the type, size and dimensions as described above, suitable welds to a reactor vessel 10 formed of stainless steel with a ¼ inch Inconel cladding were obtained by utilizing a d.c. voltage source 24 of 40 volts and by applying this voltage between the metal sheath 20 and the wall 10 for a period of 1 second so as to cause a d.c. current of 250±25 amp to flow through the thermocouple sheath 20 and then through the weld area. Surprisingly, it was found that similar voltage, current and time parameters where required to produce suitable welds both when making the welds in air and when making the welds underwater, i.e. without an inert gas atmosphere.

It will be understood that the above description of the present invention is susceptible to various modifications, changes and adaptations, and the same are intended to be comprehended within the meaning and range of equivalents of the appended claims.

What is claimed is:

1. A method of mounting a thermocouple assembly on a surface of a metal member wherein the thermocouple assembly includes an elongated tubular metal sheath having a metal tip portion closing one end, a pair of spaced thermocouple conductors extending axially along the sheath and being insulated from each other and from the metal sheath with the conductors being connected to each other adjacent said one end of the sheath to form a measuring junction which is axially spaced from said metal tip portion, said method comprising the steps of:
    positioning said thermocouple assembly so that a longitudinal axis of said sheath extends perpendicular to said surface of the metal member;
    pressing said thermocouple assembly against said surface of said metal member so that an outer end surface of said tip portion contacts said surface of said metal member; and
    fusion welding said tip portion to said surface of said metal member by connecting a source of d.c. potential across said sheath and said metal member and passing a d.c. current through said metal sheath and said metal member for a desired period of time.

2. A method as defined in claim 1 wherein said metal member and at least a portion of said sheath are underwater.

3. A method as defined in claim 2 wherein said surface of said metal member is an inner surface of a nuclear reactor vessel.

4. A method as defined in claim 3 wherein said metal member is formed of stainless steel with an Inconel cladding and wherein said sheath is formed of stainless steel.

5. A method as defined in claim 1 wherein said source of d.c. potential is approximately 40 volts, said d.c. current is approximately 250 amperes and said desired period of time is approximately one second.

6. A method as defined in claim 2 further comprising surrounding at least the portion of said sheath which is underwater with an inert gas atmosphere during said step of fusion welding.

7. A method of attaching a thermocouple assembly to a surface of a metal member comprising the steps of:
    providing a thermocouple assembly including a pair of thermocouple conductors disposed in and spaced from a metal tubular sheath which is closed at one end by a solid metal tip portion having a flat outer end surface which is perpendicular to the longitudinal axis of said sheath and an inner end surface, and with the pair of conductors being connected together to form a measuring junction adjacent said inner end surface;
    positioning said thermocouple assembly so that said flat surface of said tip portion contacts said surface of said metal member and said axis of said sheath is perpendicular to said surface of said metal member; and
    fusion welding said tip portion of said sheath to said surface of said metal member by connecting a source of d.c. potential to said metal member and to said sheath and passing a d.c. current through said sheath and said metal member for a predetermined period of time, whereby said attachment can be made from a remote location.

8. A method as defined in claim 7 wherein said metal member is underwater, said thermocouple assembly extends out of said water; and said source of d.c. potential is connected to said sheath outside of said water.

9. A method as defined in claim 8 wherein said metal member is a nuclear reactor vessel and said surface is an inner surface of said vessel.

10. A method as defined in claim 9 further comprising surrounding at least the portion of said sheath which is underwater with an inert gas atmosphere.

11. A method as defined in claim 7 wherein said flat outer surface has a diameter which is less than the diameter of said sheath.

12. A method as defined in claim 11 wherein said sheath has a diameter of one eighth inch and a wall thickness of approximately 0.016 inch, said outer surface of said tip portion has a diameter of 0.040–0.060 inch, and wherein the peripheral surface of said tip portion tapers from said diameter of said outer surface of said tip portion to the diameter of said sheath.

13. A method as defined in claim 12 wherein said sheath is formed of stainless steel, said metal member is formed of stainless steel with an Inconel cladding, said d.c. potential is approximately 40 volts and said predetermined period of time is approximately one second.

14. A method as defined in claim 12 wherein said measuring junction is spaced from the inner end surface of said tip portion by 0.010 to 0.020 inch.

* * * * *